United States Patent [19]

Herzl

[11] 4,169,376
[45] Oct. 2, 1979

[54] EXTERNAL SENSING SYSTEM FOR VORTEX-TYPE FLOWMETERS

[75] Inventor: Peter J. Herzl, Morrisville, Pa.

[73] Assignee: Fischer & Porter Company, Warminster, Pa.

[21] Appl. No.: 919,247

[22] Filed: Jun. 26, 1978

[51] Int. Cl.² .............................................. G01F 1/32
[52] U.S. Cl. .............................................. 73/194 VS
[58] Field of Search .............................................. 73/194 VS

[56] References Cited

U.S. PATENT DOCUMENTS

| | | | |
|---|---|---|---|
| 1,935,445 | 11/1933 | Heinz | 73/194 |
| 3,722,273 | 3/1973 | Yamasaki et al. | 73/194 |
| 4,085,614 | 4/1978 | Curran et al. | 73/194 |

Primary Examiner—Herbert Goldstein
Attorney, Agent, or Firm—Michael Ebert

[57] ABSTRACT

An external sensing system for a vortex-type flowmeter in which the fluid to be metered is conducted through a flow tube having an obstacle assembly therein to produce periodic vortices which cause a deflectable section of the assembly to vibrate at the same rate. These vibrations are mechanically transmitted to a point outside the flow tube which is linked to the diaphragm of a pneumatic cell to generate in the cell chamber a compressional wave that is conveyed by a pipe to the cavity of a pick-up cell having a force sensor therein. The pipe has a constricted passage which acts to attenuate the compressional wave and thereby reduce the dynamic range of the system, the pipe also serving to effectively isolate the sensor from the temperature of the fluid being metered. The sensor yields a signal whose amplitude is indicative of the mass of the fluid and whose frequency is indicative of the volumetric flow rate thereof.

4 Claims, 7 Drawing Figures

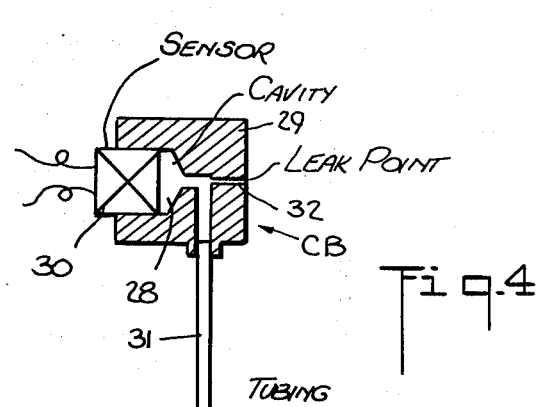
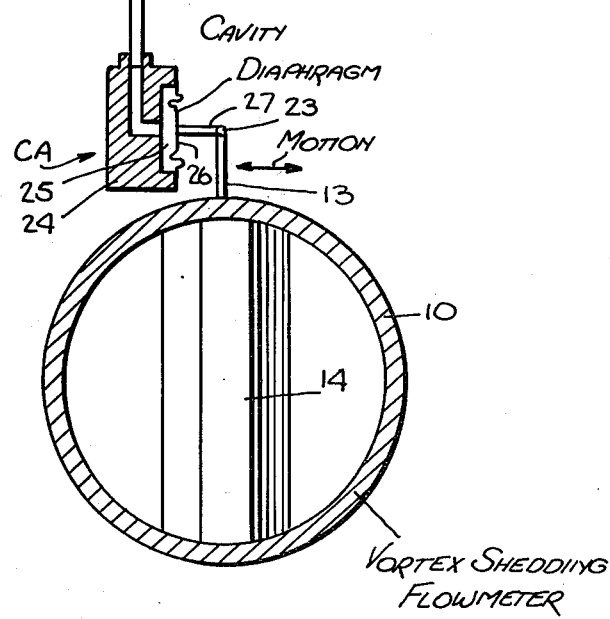
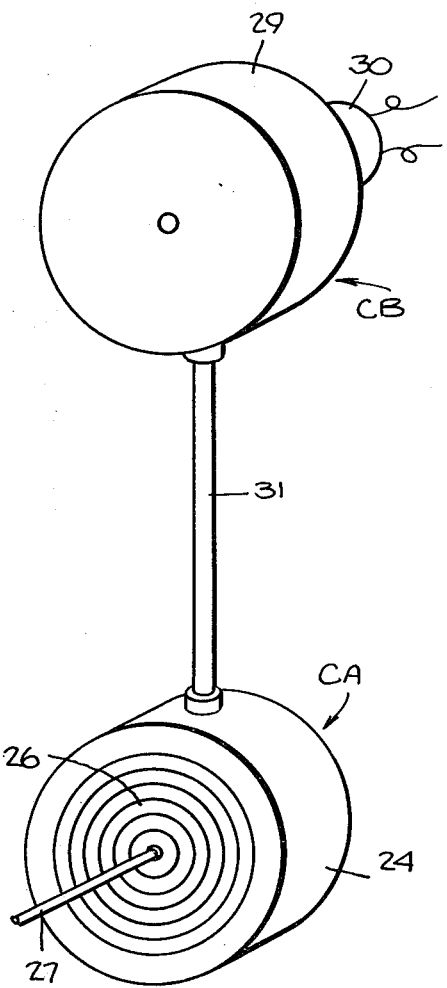
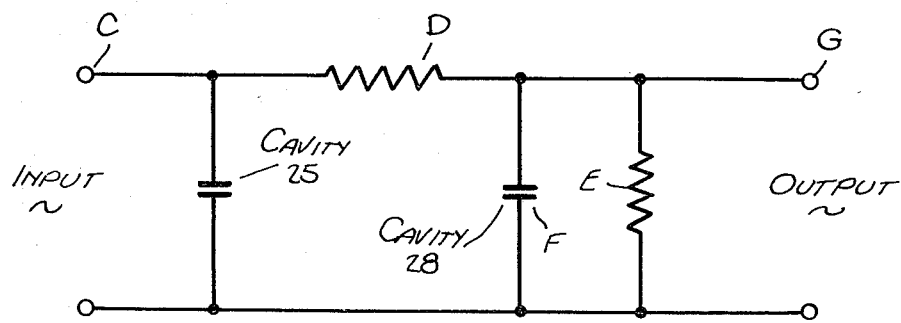

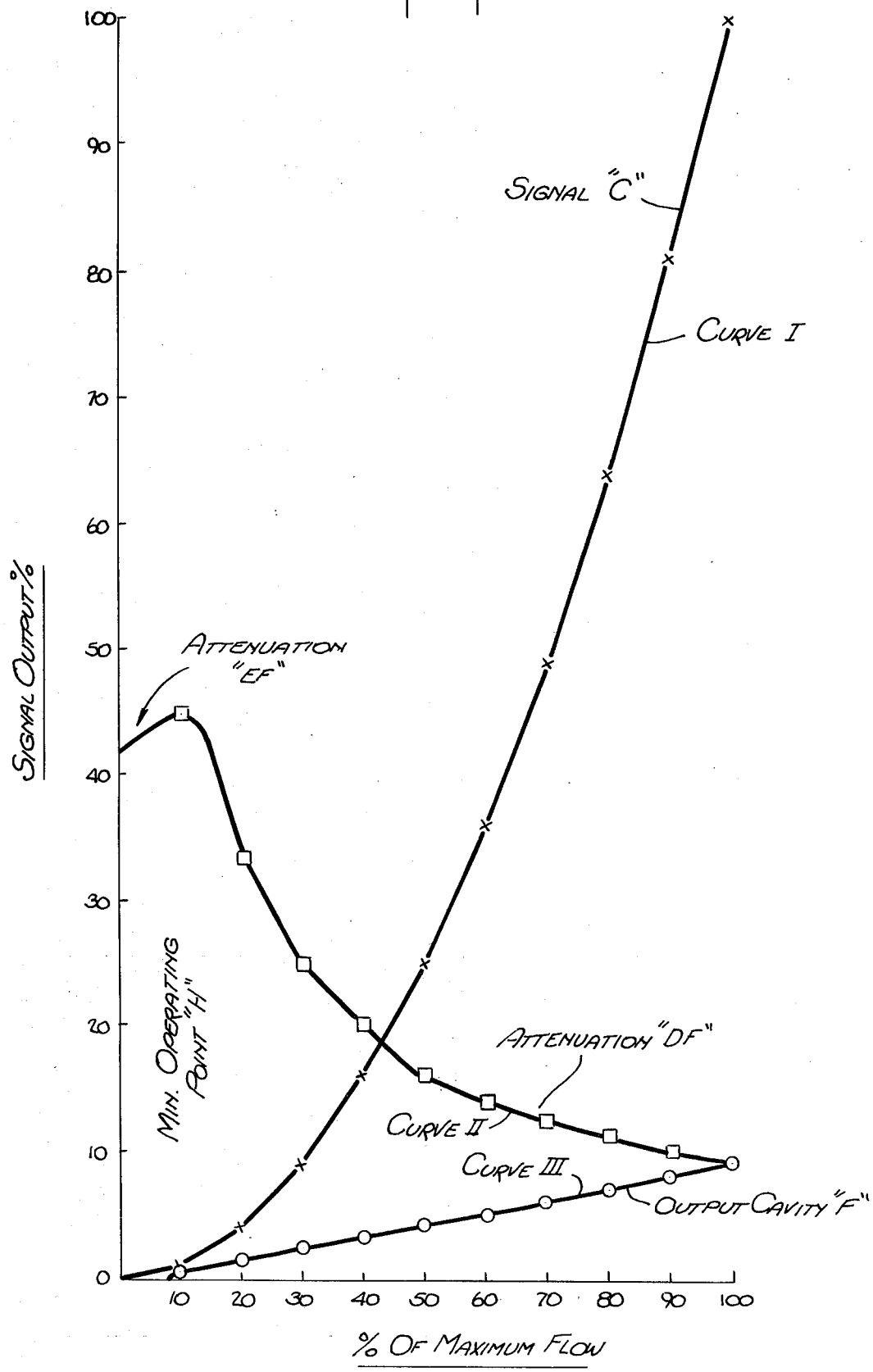

EXTERNAL SENSING SYSTEM FOR VORTEX-TYPE FLOWMETERS

BACKGROUND OF INVENTION

This invention relates generally to vortex-type flowmeters acting to convert fluidic oscillations to corresponding mechanical vibrations which are transmitted to an external force sensor, and more particularly to a sensing system for a flowmeter of this type whose output signal is indicative of the mass of the fluid passing through the meter.

It is well known that under certain circumstances the presence of an obstacle in a flow conduit will give rise to periodic fluidic vortices. For small Reynolds numbers, the downstream wake is laminar in nature, but at increasing Reynolds numbers, regular vortex patterns are formed, these being known as Karman vortex streets. The periodicity at which vortices are shed in a Karman vortex street is a function of flow rate.

In many industrial processes, one must be able to measure the volumetric flow of fluids being treated or supplied in order to carry out various control functions. It is also necessary, in some instances, to determine the mass flow of the fluids. Existing types of vortex flowmeters are capable of effecting volumetric flow or mass flow measurement.

The Burgess U.S. Pat. No. 3,888,120 discloses a vortex-type flowmeter including an obstacle assembly mounted in a flow tube through which the fluid to be metered is conducted, the assembly being formed by a front section fixedly mounted across the tube and a rear section cantilevered from the front section by means of a flexible beam to define a gap serving to trap the Karman vortices. Because the rear section is deflectable, it is excited into mechanical vibration by the vortices at a rate whose frequency is proportional to fluid flow. These mechanical vibrations are sensed by a strain gauge mounted on the flexible beam, the gauge serving to convert the mechanical vibrations into a corresponding electrical signal whose frequency is a function of flow rate.

In the Herzl et al. U.S. Pat. No. 4,033,189, the transducer for converting the mechanical vibrations produced by the deflectable section of the obstacle assembly into an electrical signal is a force sensor external to the flow tube. To this end, the vibrations are mechanically transmitted from the deflectable section of the obstacle assembly to a coupling point outside the flow tube, which coupling point is engaged by the force sensor.

In many industrial processes and in various chemical applications, one must not only measure the volumetric flow of fluids being treated or supplied, but also the mass flow thereof. Thus in certain chemical applications, the quantities of reactants are best specified according to mass, and in metering combustible gas supplied to consumers, one must know the total mass of the gas supplied. When standard volumetric flowmeters are employed for this purpose, it is necessary to convert the volume measurement to a reading of mass flow.

This conversion is readily effected by multiplying the volume measurement by the density of the fluid being measured. Hence the volumetric flowmeter must include indicating means that are calibrated to account for the density factor. Since the density of a given fluid is a function of its temperature and pressure, should the meter be calibrated on the assumption that temperature and pressure is fixed at some value, the mass reading would be inaccurate by reason of inevitable fluctuations in temperature and pressure. Thus it has generally been necessary, in order to produce highly accurate mass flow readings, to determine the actual density of the fluid, rather than to assume an unchanging density value.

To simplify the measurement of mass flow, the Herzl U.S. Pat. No. 3,776,033 provides a vortex meter which includes a pressure-responsive transducer adapted to generate an electrical signal whose frequency is proportional to the fluidic pulse rate and whose amplitude is a function of the kinetic energy contained in the vortex. The transducer signal is processed by an operational amplifier, the gain of which is inversely proportional to frequency, thereby effectively dividing the transducer signal by frequency throughout the operating range of the meter to yield an output signal whose amplitude is indicative of mass flow. By additionally dividing this output signal by frequency with a second amplifier having a gain which is inversely proportional to frequency, a signal indicative of the fluid density is produced.

The use of force sensors such as piezoelectric pressure-responsive elements in a vortex meter has distinct advantages, for such sensors are relatively immune to dirt and other contaminating coatings and have a proven performance record. As explained in the above-cited Herzl patent relating to vortex-type mass flowmeters, pressure changes detected by the force sensor are converted in corresponding changes in amplitude in the signal generated thereby, this amplitude being a function of the kinetic energy contained in the fluid vortex. This relationship is expressed by the following equation:

$$A = KpV^2$$

where A is the output amplitude
p is the fluid density
V is the fluid velocity.

If, for example, a vortex flowmeter were to operate over a 15 to 1 velocity range and a 2 to 1 density range, the ratio signal amplitudes would equal:

$$K_p V^2 / K_p V^2 = 2 \times 225 / 1 \times 1 = 450 \text{ to } 1$$

Assuming that one wished to maintain a 10 to 1 signal-to-noise ratio at the minimum condition, the sensing system for this purpose would require a signal-to-noise ratio of 10×450 or 4500 to 1. There are very few commercially-available sensors that would satisfy this requirement. And if one wished to operate in a 30 to 1 range with a 2 to 1 density change, this would call for a sensing system with an 18,000 to 1 signal-to-noise ratio. This broad dynamic range is virtually impossible to attain in a practical sensing system.

Another factor that one must take into account in connection with sensing systems for vortex meters is the adverse effect of temperature on the accuracy of the system. Where the sensor is disposed within the flow tube and the meter is to be used for measuring fluids in a broad temperature range whose lower end is well below 0° C. and whose upper end is well above 100° C., the sensor will be heated or cooled by the fluid and will produce an output having an error component reflecting the fluid temperature. Even when the sensor is of the external type, it will still be affected by the temperature of the fluid conducted through the flow tube, for the sensor is in close proximity to the wall of the flow tube.

The concern of the present invention is with sensing systems for vortex flowmeters of the external sensor type. Such sensing systems of the type heretofore known have three drawbacks:

(1) for purposes of providing a mass flow reading, they require relatively complex electronic circuits operating in conjunction with the sensing system to derive from the amplitude and frequency of the sensor signal a signal indicative of mass flow.

(2) The accuracy and reliability of the sensing system is adversely affected by the temperature of the fluid being metered.

(3) The sensor is incapable of coping with the broad dynamic range of the system.

SUMMARY OF THE INVENTION

In view of the foregoing, the main object of this invention is to provide an external sensing system for a vortex-type flowmeter, which system has a sensor that is effectively isolated from the temperature of the fluid being metered, so that the flowmeter is capable of affording accurate readings throughout a greatly extended temperature range.

Also an object of the invention is to provide a sensing system to the above-identified type in which the dynamic range requirement for the force sensor is greatly reduced.

Still another object of the invention is to provide a sensing system producing a characterized output signal that is directly indicative of the mass of the fluid being measured, thereby obviating the need for the complex electronic circuits heretofore required to derive a mass flow reading from a vortex-type meter.

A significant feature of the invention is that all of the above objects are attained in a sensing system of simple and inexpensive design which operates efficiently and reliably.

Briefly stated, these objects are attained in an external sensing system for a vortex flowmeter in which the fluid to be measured is conducted through a flow tube having an obstacle assembly mounted therein capable of generating periodic vortices causing a deflectable section of the assembly to vibrate at a corresponding rate. The vibrations are mechanically transmitted to a point outside the tube which is linked to the diaphragm in the chamber of a pneumatic cell in close proximity to the tube.

The chamber of the pneumatic cell of the sensing system is coupled by a pipe to the internal cavity of a pressure-pick cell having a force sensor mounted thereon, whereby the compressional wave produced by the vibrating diaphragm of the pneumatic cell is conveyed to the pick-up cell and is detected by the force sensor to produce an output signal whose amplitude is proportional to the mass of the fluid flowing through the flowmeter and whose frequency reflects the flow rate thereof.

The pipe is of small diameter and forms a constricted passage offering significant resistance to the compressional wave, the resultant attenuation serving to reduce the dynamic range required by the sensing system for a given flow range. Because the pipe acts to remove the sensor from the immediate vicinity of the flow tube, the sensor operates at close to ambient temperatures and is not subject to temperature extremes.

OUTLINE OF DRAWINGS

For a better understanding of the invention as well as other objects and further features thereof, reference is made to the following detailed description to be read in conjunction with the accompanying drawings, wherein:

FIG. 4 is a sectional view of an external sensing system in accordance with the invention;

FIG. 5 is a perspective view of the sensing system;

FIG. 6 is the electrical circuit equivalent to the sensing system; and

FIG. 7 is a curve representing the amplitude of the signal produced by the sensing system.

DESCRIPTION OF INVENTION

The Vortex Meter

Figure 1:
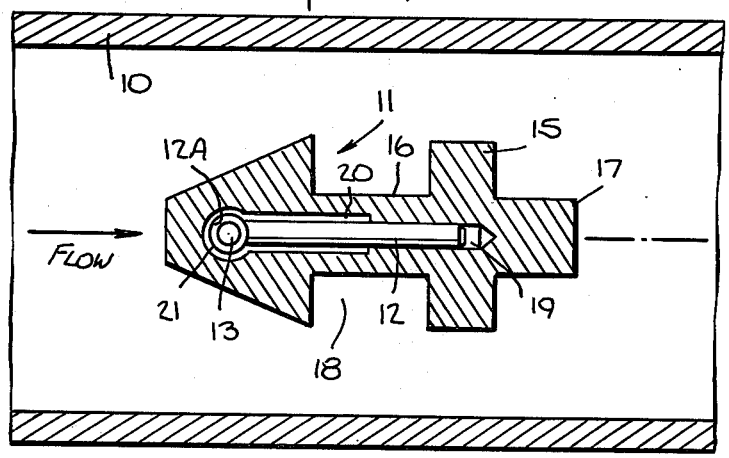
FIG. 1 is a longitudinal section taken through an external sensor vortex flowmeter including a vibration transmitter for transmitting vibrations to an external sensing system in accordance with the invention.
Figure 2:
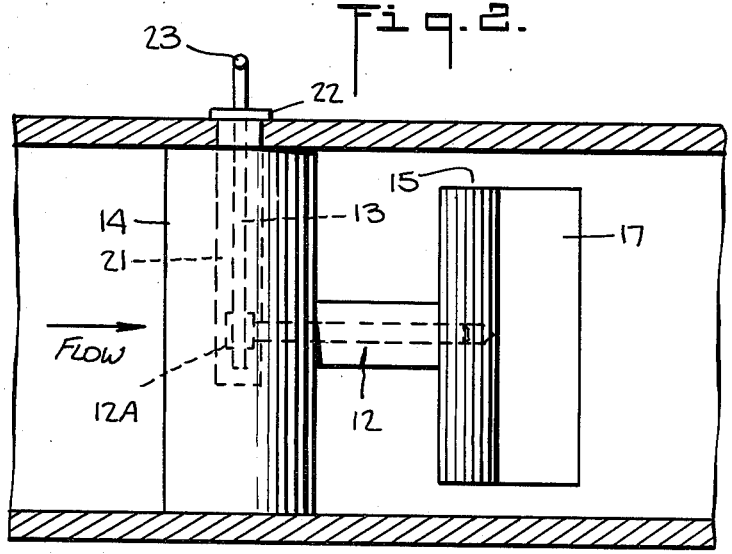
FIG. 2 is a section taken through the meter shown in FIG. 1 in the plane indicated by line 2—2 in FIG. 1.
Figure 3:
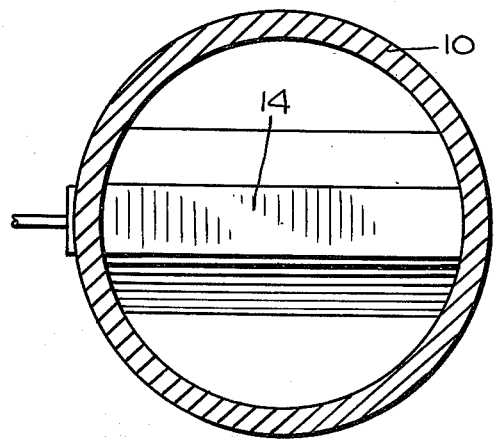
FIG. 3 is a front view of the meter.

Referring now to FIGS. 1 to 3, there is shown a vortex-type flowmeter including a flow tube 10 interposed in a fluid process or any other line through which flows a fluid to be metered. For this purpose, the flow tube may be provided with end flanges to facilitate coupling to the fluid line.

Mounted within flow tube 10 is an obstacle assembly, generally designated by numeral 11, the assembly including a deflectable section which is responsive to the Karman vortex street and is caused to vibrate microscopically at a frequency proportional to flow rate. Incorporated in the obstacle assembly is a vibration transmitter composed of a rod 12 and a probe 13.

Flow tube 10, which is shown as having a circular cross-section but which may be in other suitable cross-sectional forms, includes an inlet into which the fluid to be metered is introduced. The flow impinges on obstacle assembly 11 which acts to divide the flow around the obstacle, producing fluidic perturbations in the form of a Karman vortex street. Obstacle assembly 11 is constituted by a transversely-mounted front section 14 and a rear section 15 mounted behind the front section by a cantilever support in the form of a flexible web or beam 16. Extending downstream from rear section 15 is a tail 17.

Front section 14 is a contoured block having a triangular, delta-shaped or any other suitable cross-section. The extremities of the front section are secured to the wall of the tube whereby the front section is held fixedly within the tube. The apex of block 14 faces the incoming fluid, the inclined sides thereof forming leading edges which are swept by the fluid flow to create vortices.

Rear section 15 takes the form of a non-streamlined body having a rectangular cross-section which is maintained by web 16 is spaced relation to the front section, the plane of the rear section being parallel to the flat base of the front section. The rear section shape is such as to interfere with the vortex street, and the gap 18 established between the front section block and the rear section tends to trap the vortices and to strengthen and stabilize the vortex street produced thereby. The geometry of the obstacle assembly as illustrated herein is merely by way of example; for in practice, the geometry may assume other forms which are effective in producing vortices.

Because rear section 15 is cantilevered by means of flexible beam 16, it is deflectable. The beam, though bendable, has sufficient rigidity so as to permit only a slight deflection of the rear section. As a consequence of the fluidic oscillations produced within the flow tube, the deflectable rear section 15 is excited into vibration at a rate corresponding to the frequency of the oscillations.

The natural resonance of the deflectable rear section is such as to be well outside the normal frequency range of the meter whereby mechanical resonance peaks are absent and the amplitude of the vibrating motion accurately reflects the amplitude of the fluidic oscillations. This vibratory motion is enhanced by tail 17. The downstream section of the assembly carries out two functions; for this section which interferes with the wake not only stabilizes it to enhance its detectability, but its vibratory motion gives rise to the output signal.

Because the deflectable system is relatively rigid, the total excursion of the rear section is minute even at the highest amplitudes of fluidic oscillation, so that metal fatigue of the supporting web, as a result of the vibrating action, is minimized and failures do not arise after prolonged operation.

The minute operations of the deflectable rear section of the obstacle assembly are sensed outside of flow tube 10 rather than within the tube. For this purpose, the vibrations are conveyed by the vibration transmitter, including rod 12, whose rear portion is socketed within a bore 19 within deflectable section 15. The front portion of rod 12 lies freely within a relatively large diameter, longitudinally-extending bore 20 communicating with the smaller diameter bore 19 and extending well into front section 14. Rod 12 terminates in a collar 12A which encircles the end portion of probe 13 to provide a link between the rod and the probe. Probe 13 extends through a longitudinal passage 21 in front section 14 and projects through an opening in the wall of flow tube 10 which is covered by a flexible diaphragm 22. Probe 13 terminates at a sensing point 23 outside of the flow tube which is adjacent the wall of the tube.

The invention does not reside in the structure and function of the vortex-type flowmeter, but in a sensing system operable with any known type of meter which includes a deflectable section caused to vibrate by the periodic vortices generated within the flow tube, these vibrations being transmitted to an external sensor.

The External Sensing System

As shown in FIGS. 4 and 5, the main components of the external sensing system in accordance with the invention are a pneumatic cell CA forming the input stage, and a pick-up cell CB forming the output stage, the cells being pneumatically intercoupled by a pipe 31.

Pneumatic cell CA includes a cylindrical body 24 formed of a metal of high thermal conductivity such as aluminum or stainless steel, the body having a chamber 25 therein which is covered by a flexible diaphragm 26. The center of diaphragm 26 is linked by a link rod 27 to sensing point 23. Thus as sensing point 23 vibrates back and fourth in accordance with the periodic vortices produced in the flow tube as a result of fluid flow, these vibrations are transmitted by link rod 27 to diaphragm 26.

The diaphragm acts to alternately compress and decompress the air in chamber 25 at the same rate as the periodic vortices. This compression and decompression of the air in the chamber produces a compressional wave which is conveyed by pipe 31 to a cavity 28 formed in the cylindrical body 29 of pick-up cell CB. Cavity 28 has a horn-shaped configuration whose output is acoustically coupled to a pressure-sensitive transducer 30 mounted on this cell. A highly restricted leak duct 32 in the body of the pick-up cell serves to expose cavity 28 therein to the atmosphere and acts to attenuate low-frequency transmission and to equalize the pressure inside and outside the sensing system. These low frequencies below the normal operating frequency of the meter contain hydraulic noise which makes recognition of the meter signal more difficult.

Pressure-sensitive transducer 30 may take the form of a microphone operable in the sonic frequency range such as a dynamic, condenser, ceramic, carbon or other commercially available unit, or it may be any other available type of sensor capable of generating an electrical signal whose frequency and amplitude reflects the frequency and amplitude of the compressional wave applied thereto.

A preferred form of sensor is the PRIMO EM-60B electret condenser microphone cartridge which incorporates an integrated circuit pre-amplifier to afford a high-fidelity response, good signal-to-noise ratio and low output impedance (200 to 850 ohms at 1 kHz). The microphone has an operation temperature range of $-10°$ to $+60°$ C.

Because body 24 of pneumatic cell CA is of high thermal conductivity and is thermally coupled by link rod 27 to the vortex meter, the temperature of the fluid being metered will to some degree affect the temperature of the cell. However, the body acts to absorb and radiate heat; hence the air in chamber 25 will not acquire the temperature of the fluid being metered, but will be close to ambient temperature.

Pipe 31 is preferably formed of synthetic plastic tubing such as polyamide plastic for temperatures up to about 450° F. Such tubing has low thermal conductivity—hence it does not act to transmit heat from the pneumatic cell to the pick-up cell. As a consequence, pick-up cell CB is removed from flow tube 10 by a distance which is somewhat greater than the length of pipe P and is substantially immune to the effects of the temperature of the fluid being metered. For very high temperatures in which plastic tubing cannot be used, the tubing can be of stainless steel.

The internal diameter of pipe 31 is very small to provide a constricted air passage, the diameter preferably falling within a range of 0.01 to 0.03 inches. The selected bore diameter depends on the length of the pipe. Thus for a four-inch pipe, the preferred internal diameter is 0.025 inches. Pipe 31 therefore offers significant resistance to the passage of the compressional wave and behaves as an attenuator therefor.

The the mechanical vibrations which are produced as a function of the periodic vortices generated in the flowmeter are converted by pneumatic cell CA into a corresponding compressional wave, this wave being converted by pick-up CB cell into a corresponding a-c electrical wave.

Referring now to FIG. 6, which shows the electrical equivalent to the pneumatic sensing system, the pressure changes in chamber 25 of pneumatic cell CA appear at the input of the network to look like an a-c voltage. Pipe 31, because it offers resistance to the compressional wave, is represented by a resistor D. Cavity 28 in the pick-up cell behaves as a capacitor F, whereas the leak 31 in the cavity functions as a resistor E. Thus pressure changes in cavity 28 result in an a-c output voltage in sensor 30 and are represented by the output voltage G at the output terminals. The frequency of the output voltage represents the volumetric flow rate.

FIG. 7 shows the resulting amplitudes of the a-c signal. Curve I represents the amplitude of the signal in chamber 25 of the pneumatic cell. It will be seen that the amplitude from 0 to 100% of maximum flow extends from 0 to 100 in a curve which is fairly linear. Curve II is an attenuation curve. Curve III represents the amplitude of the signal G obtained in cavity 28 of the pick-up cell.

To simplify the discussion of curves II and III, we shall, in the following example, assign arbitrary numbers for the operating frequencies of the flowmeter.

At 100% of maximum flow, we shall assume that the meter frequency equals 100 Hz, so that at 10% of maximum flow, the frequency then equals 10 Hz. We shall further assume that 10% of maximum flow or 10 Hz is the minimum operating frequency of the flowmeter.

Resistor D and capacitor F together define a low pass filter with an amplitude response of 1/operating frequency when operating well above the break point (where the ohmic resistance of resistor D equals the reactance of capacitor F). If the values of D and F are selected so that the breakpoint falls at 10% or 10 Hz, the minimum operating frequency, then that section of curve II marked attenuation "DF" represents the attenuation characteristics of this filter section. Capacitor "F" and resistor "E" also form a high pass filter. If the value of resistor "E" is selected so that the breakpoint (where resistance of "E" equals reactance of capacitor "F") with previously selected capacitor "F" falls at approximately 5 Hz, 5%, or half the minimum operating frequency, then the section of Curve II, marked attenuation of "EF" represents the attenuation characteristics of this filter section. Thus curve II represents the attenuation characteristics of the total equivalent network illustrated in FIG. 6.

The output of cavity 28 which is sensed by transducer 30 is obtained by multiplying curves I and II. The table below compares the signal amplitude range for several flow ranges at fixed densities, but it does not include the signal-to-noise ratio required at minimum flow.

| | SIGNAL AMPLITUDES | | | | | |
|---|---|---|---|---|---|---|
| | NOT CHARACTERIZED "A" | | | CHARACTERIZED "G" | | |
| FLOW RANGE | MIN FLOW | MAX FLOW | RATIO | MIN FLOW | MAX FLOW | RATIO |
| 10 to 1 | 1 | 100 | 100/1 | .45 | 9 | 20/1 |
| 15 to 1 | 1 | 225 | 225/1 | .45 | 14 | 31/1 |
| 30 to 1 | 1 | 900 | 900/1 | .45 | 29 | 64/1 |
| 50 to 1 | 1 | 2500 | 2500/1 | .45 | 49 | 109/1 |
| 75 to 1 | 1 | 5625 | 5625/1 | .45 | 74 | 163/1 |
| 100 to 1 | 1 | 10000 | 10000/1 | .45 | 99 | 220/1 |

The above table clearly illustrates the reduction in dynamic range required by the sensing system for a given flow range.

With respect to the temperature performance of the external sensing system in which the sensor is effectively isolated thermally from the vortex type meter, it has the advantage that nearly all sensors are less expensive and more reliable if they are not to be exposed to extreme levels of temperature. A temperature of 600° F. represents the upper limits of most organic insulation systems, above which temperature it is difficult to maintain the integrity of the insulation. On the other hand, metals can operate at much higher temperatures. Thus many stainless steels lose only about 25% of their structural strength at 1000° F., and some grades of this metal can be used at temperatures up to 1600° F. when derated by 80%. Moreover, many stainless steels are structurally effective in the cryogenic range.

But no known sensor can function effectively over a range running from cryogenic to extremely hot. But since pipe 31 allows location of the sensor at significant distance from the flowmeter, the temperature effect on the sensor is markedly reduced, and this allows the flowmeter to operate within the broad temperature limits imposed by the metals used in its construction.

In the Herzl U.S. Pat. No. 3,776,033, a reading of mass is obtained from the flow rate meter by the use of an i/f function to extract the mass flow information. In the present invention, pipe 31 producing resistance D and cavity 28 behaving as capacitor F together carry out the identical function; hence the output signal from sensor 30 is representative of mass flow.

While there has been shown and described a preferred embodiment of an external sensing system for vortex-type flowmeters in accordance with the invention, it will be appreciated that many changes and modifications may be made therein without, however, departing from the essential spirit thereof. Thus while the system described herein uses air in the cavities to transmit the flowmeter signal from the pneumatic cell to the pick-up cell, other fluids may be preferred or desirable in some special situations.

I claim:

1. An external sensing system for a vortex-type flowmeter in which the fluid to be metered is conducted through a flow tube having an obstacle assembly therein producing periodic vortices which cause a deflectable element to vibrate at the same rate, these vibrations being transmitted to an external sensing point, said system comprising:
   A. a pneumatic cell whose body has a chamber therein covered by a diaphragm which is linked to said sensing point and is vibrated to generate a compressional wave corresponding to said periodic vortices;
   B. a pick-up cell whose body has a cavity therein which is covered by a pressure-sensitive transducer; and
   C. a pipe coupling said chamber to said cavity, whereby said compressional wave is conveyed to said transducer to generate an output signal, said pipe having a relatively small diameter to define a constricted passage offering significant resistance to said compressional wave to a degree causing said transducer to provide an output signal whose frequency is a function of the flow rate and whose amplitude is inversely proportional to said frequency and is therefore proportional to the mass of the fluid flowing through said tube.

2. A sensing system as set forth in claim 1, further including a leakage path between said pick-up cell cavity and the atmosphere to attenuate low frequencies below the normal operating frequency of the meter and to equalize the pressure inside and outside the sensing system.

3. A system as set forth in claim 1, wherein said transducer is a microphone.

4. A system as set forth in claim 3, wherein said microphone is an electret cartridge.

* * * * *